United States Patent
Hussain et al.

(10) Patent No.: US 10,505,655 B2
(45) Date of Patent: Dec. 10, 2019

(54) FLEXE GMPLS SIGNALING EXTENSIONS

(71) Applicant: Infinera Corp., Annapolis Junction, MD (US)

(72) Inventors: Iftekhar Hussain, Santa Clara, CA (US); Radhakrishna Valiveti, Union City, CA (US); Khuzema Pithewan, San Jose, CA (US)

(73) Assignee: Infinera Corp., Annapolis Junction, MD (US)

( * ) Notice: Subject to any disclaimer, the term of this patent is extended or adjusted under 35 U.S.C. 154(b) by 0 days.

(21) Appl. No.: 15/643,758

(22) Filed: Jul. 7, 2017

(65) Prior Publication Data

US 2018/0013511 A1    Jan. 11, 2018

Related U.S. Application Data

(60) Provisional application No. 62/359,371, filed on Jul. 7, 2016.

(51) Int. Cl.
| | |
|---|---|
| *H04L 12/28* | (2006.01) |
| *H04J 14/02* | (2006.01) |
| *G02B 6/12* | (2006.01) |

(52) U.S. Cl.
CPC ...... *H04J 14/0204* (2013.01); *G02B 6/12033* (2013.01); *H04J 14/0205* (2013.01); *H04J 14/0212* (2013.01); *G02B 6/12019* (2013.01); *H04J 14/0213* (2013.01)

(58) Field of Classification Search
CPC ............... H04J 14/0204; H04J 14/0212; H04J 14/0205; H04J 14/0213; G02B 6/12033; G02B 6/12019
USPC ......................................................... 370/389
See application file for complete search history.

(56) References Cited

U.S. PATENT DOCUMENTS

| | | | | |
|---|---|---|---|---|
| 7,668,081 | B2 * | 2/2010 | Hermsmeyer | .......... H04L 45/00 370/218 |
| 2007/0274224 | A1 * | 11/2007 | Suzuki | ..................... H04L 41/08 370/248 |
| 2009/0263129 | A1 * | 10/2009 | Draer | ................... H04J 14/0284 14/284 |
| 2010/0165884 | A1 * | 7/2010 | Farkas | ................... H04L 12/462 370/256 |
| 2016/0065407 | A1 * | 3/2016 | Saltsidis | ............. H04L 41/0806 370/255 |

* cited by examiner

*Primary Examiner* — Mang Hang Yeung
(74) *Attorney, Agent, or Firm* — David L. Soltz; Dunlap Codding

(57) ABSTRACT

Methodologies and systems that pass signals between control planes of nodes within a FlexE Network also conforming to the Generalized Multiprotocol Label Switching (GMPLS) protocol are described. The signals passed between the control planes conform to the GMPLS protocol and comprise a FlexE Ethernet Group Number and identify at least one Ethernet PHY conforming to the requirements of IEEE 802.3-2015. The Flexible Ethernet Group Number and the at least one Ethernet PHY are stored in non-transitory memory accessible by a node within the FlexE Network. Then, the node configures a FlexE Group based upon the Flexible Ethernet Group Number and the at least one Ethernet PHY.

16 Claims, 5 Drawing Sheets

FLEXE GMPLS SIGNALING EXTENSIONS

INCORPORATION BY REFERENCE

The present patent application claims priority to the provisional patent application identified by U.S. Ser. No. 62/359,371 titled "FlexE GMPLS Signaling Extensions" filed on Jul. 7, 2016, the entire contents of which are hereby incorporated herein by reference.

FIELD OF THE DISCLOSURE

The disclosure generally relates to methods and systems for traffic engineering using GMPLS mechanisms in a Flexible Ethernet Network (FlexE). More particularly the disclosure relates to systems and methods for GMPLS signaling extensions assigning group numbers to specific FlexE Groups and then assigning particular clients to the FlexE Groups.

BACKGROUND

An Optical Transport Network (OTN) is comprised of a plurality of switch nodes linked together to form a network. The OTN includes an electronic layer and an optical layer. The electronic layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. In general, the OTN is a combination of the benefits of SONET/SDH technology and dense wavelength-division multiplexing (DWDM) technology (optics). OTN structure, architecture, and modeling are further described in the International Telecommunication Union recommendations, including ITU-T G.709, ITU-T G.872, and ITU-T G.805, which are well known in the art.

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management of the OTN. One prominent protocol is referred to in the art as Generalized Multiprotocol Label Switching (GMPLS).

Generalized Multiprotocol Label Switching (GMPLS) is a type of protocol which extends multiprotocol label switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel. Wave-division multiplexing is a type of multiplexing in which two or more optical carrier signals are multiplexed onto a single optical fiber by using different wavelengths (that is, colors) of laser light.

RSVP and RSVP-TE signaling protocols may be used with GMPLS. To set up a connection in an Optical Transport Network, nodes in the Optical Transport Network exchange messages with other nodes in the Optical Transport Network using RSVP or RSVP-TE signaling protocols. Resources required for the connection are reserved and switches inside the network are set. Information sent by signaling protocols are often in a type-length-value (TLV) format. The same protocols may also be used to take down connections in the Optical Transport Network when the connections are no longer needed.

OSPF and OSPF-TE routing and topology management protocols may also be used with GMPLS. Under OSPF protocols, typically each node in an Optical Transport Network maintains a database of the network topology and the current set of resources available, as well as the resources used to support traffic. In the event of any changes in the network, or simply periodically, the node "floods" the updated topology information to all the Optical Transport Network nodes attached to the node. Flooding is mechanism where information received by a node is forwarded to other nodes, and is used within the OSPF protocol as a way of distributing the updated topology information quickly to every node within the Optical Transport Network. The nodes use the database information to chart routes through the Optical Transport Network.

A Flexible Ethernet network (referred to herein as "FlexE") is a type of network that is defined by a FlexE Interoperability Agreement in 2016. FlexE supports the bonding of multiple Ethernet links, which supports creating larger links out of multiple slower links in a more efficient way than traditional link aggregation described in IEEE 802.1AX (2014). FlexE also supports the sub-rating of links, which allows an operator to only use a portion of a link. FlexE also supports the channelization of links, which allows one link to carry several lower-speed or sub-rated links from different sources. Much of the FlexE's functionality is achieved by adding a time-division multiplexing calendar that interacts with the existing Ethernet 64b66b mechanism, allowing bandwidth to be allocated with 5 Gb/s granularity. The calendar is communicated along with the data.

FlexE networks can exist in isolation (i.e. without any intervening OTNs), or can be deployed as client layers of OTNs. FlexE is backwards compatible with the existing optical transport network (OTN) infrastructure. A FlexE compatible interface can be connected to node that is not aware of FlexE. When using FlexE in this manner, FlexE traffic appears to the node as if the FlexE traffic was ordinary Ethernet traffic. In the case of the FlexE network being deployed as client layers of OTNs, FlexE information tunnels through the OTN networks—that is, the FlexE network can be described as an overlay network for the OTN. From the perspective of the FlexE network, the OTN network appears transparent, and the FlexE layer network operates independent of the underlying transport network.

A node within a FlexE network may have many physical ports. A specific type of physical port, which implements signals, formats, and interfaces compliant to IEEE 802.3-2015 is referred to in the art as an "Ethernet PHY". The physical port and the associated software or firmware can be implemented in a variety of manners depending upon the desired data rate and/or physical media, e.g., optical or electrical, used to convey the data. As the Ethernet technology developed, many Ethernet rates were standardized, e.g. 10 M, 100 M, 1 G, 10 G, 40 G, and 100 G. 100 G is the highest standard Ethernet rate available today.

FlexE is a technology that provides a generic mechanism that can be used within a network for supporting a variety of Ethernet Media Access Control (MAC) rates (e.g., 25 Gb/s, 50 Gb/s, 200 Gb/s, etc.) that may or may not correspond to any existing Ethernet PHY rate. MAC rates can be greater than any existing Ethernet PHY rate. This can be accomplished by creating a "FlexE Group" in which more than one Ethernet PHY are logically used together. MAC rates can also be less than any existing Ethernet PHY rate. This can be accomplished by using techniques known in the art as "sub-rate" and "channelization".

As discussed above, the current standards for a FlexE network specify a calendar used for time-division multiplexing. The calendar specifies a fixed granularity of 5 Gb/s and 20 slots per 100 Gb/s of FlexE group capacity. The granularity and a number of slots is fixed for all physical ports that are configured as part of a FlexE Group.

One problem that currently exists in implementing FlexE Networks is that there is no automated methodology for setting up or provisioning label switched paths within the FlexE Network.

SUMMARY

A method and system are disclosed. The problem of lack of systems and methods to automate the set up of one or more label switched paths of various bandwidths within a FlexE Network is addressed with methodologies and systems that pass signals between nodes conforming to the Generalized Multiprotocol Label Switching (GMPLS) protocol to set up a FlexE Group, and to add or remove FlexE Clients to the FlexE Group. The signals also conform to the GMPLS protocol and comprise a FlexE Ethernet Group Number and identify at least two Ethernet PHYs conforming to the requirements of IEEE 802.3. The Flexible Ethernet Group Number and the at least one Ethernet PHY are stored in non-transitory memory of a node within the FlexE Network. Then, the node configures a FlexE Group based upon the Flexible Ethernet Group Number that uses the at least two Ethernet PHYs.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
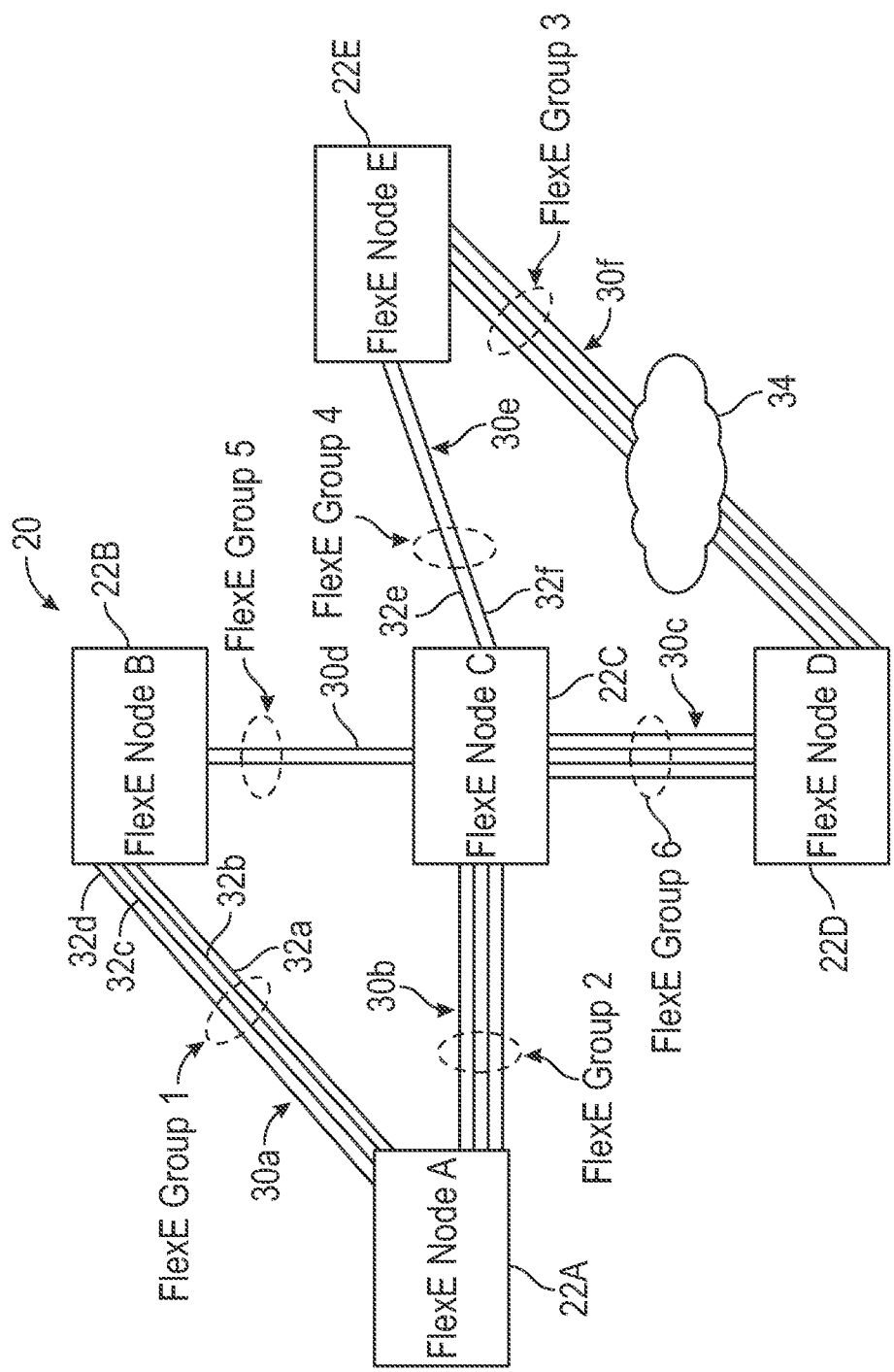
FIG. 1 is a block diagram of an exemplary FlexE Network.

The following detailed description refers to the accompanying drawings. The same reference numbers in different drawings may identify the same or similar elements.

The mechanisms proposed in this disclosure circumvent the problems described above. The present disclosure improves upon the FlexE network by extending (i.e., adapting) GMPLS mechanisms which have been successfully used in OTN networks, to control the setup and provisioning of label switched paths (referred to herein as "FlexE LSP") within FlexE networks. New GMPLS signaling extensions proposed herein convey information and are used to configure nodes within the FlexE network to automate service setup tasks, reduce error prone manual tasks and improve the overall user experience. The problem of lack of systems and methods to automate the set up of one or more label switched paths of various bandwidths within a FlexE Network is addressed with methodologies and systems that pass signals between control planes of nodes conforming to the Generalized Multiprotocol Label Switching (GMPLS) protocol. The signals passed between the control planes also conform to the GMPLS protocol and comprise a FlexE Ethernet Group Number and identify at least one Ethernet PHY conforming to the requirements of IEEE 802.3. The Flexible Ethernet Group Number and the at least one Ethernet PHY are stored in non-transitory memory of a node within the FlexE Network. Then, the node configures a FlexE Group based upon the Flexible Ethernet Group Number and the at least one Ethernet PHY to reserve bandwidth for potential FlexE label switched paths set up for FlexE clients. Once the FlexE Group is setup, then the available bandwidth is advertised to nodes within the FlexE Network and can be used by the nodes within the FlexE Network to set up the FlexE label switched paths.

DEFINITIONS

If used throughout the description and the drawings, the following short terms have the following meanings unless otherwise stated:

BW stands for Bandwidth. Bandwidth is the data transfer capacity of a link or connection in the Optical Transport Network, which may be expressed in optical data units, bits per second, number of time slots, or expressed by other methods.

DWDM stands for dense wavelength division multiplexing. DWDM multiplexes multiple optical carrier signals, such as Optical Channel (OCh) signals, onto a single optical fiber by using different laser light wavelengths (colors).

Ethernet PHY stands for a specific type of physical port, which implements signals, formats, and interfaces compliant to IEEE 802.3. The physical port and the associated software or firmware can be implemented in a variety of manners depending upon the desired data rate and/or physical media, e.g., optical or electrical, used to convey the data. The current highest industry standard data rate for Ethernet ports is 100 Gb/s. The processing steps for the Ethernet PHY forms an Ethernet PHY layer including the following sublayers: Physical Coding Sublayer (PCS), Physical Media Attachment Sublayer (PMA), and Physical Media Dependent Sublayer (PMD).

FEC stands for Forward Error Correction.

Flex Ethernet (FlexE) is a technology that provides a generic mechanism that can be used within a network for supporting a variety of Ethernet Media Access Control (MAC) rates (e.g., 25 Gb/s, 50 Gb/s, 200 Gb/s, etc.) that may or may not correspond to any existing Ethernet PHY rate. The Flex Ethernet framework is defined in a Flex Ethernet Implementation Agreement dated March 2016 from the Optical Internetworking Forum.

FlexE Group stands for a group of at least one Ethernet PHY. When the FlexE Group has at least two Ethernet PHYs, the Ethernet PHYs are bonded meaning that the transmission capacity of the Ethernet PHYs are summed and used logically together. A FlexE group is logically equivalent to an interface.

FlexE Client stands for an Ethernet flow based on a MAC (Media Access Control) data rate that may or may not correspond to any Ethernet PHY rate (e.g., 10, 40, m×25 Gb/s). A label switched path for a FlexE client can span one or multiple FlexE links in the network.

FlexE Shim stands for a layer that maps or demaps the FlexE clients carried over a FlexE group.

FlexE Calendar stands for a representation of a FlexE group of n PHYs as a calendar of x slots used for scheduling of slots among the FlexE clients. Although many standard Ethernet rates exist at this point, the 100 Gb/s interface is the only data rate that is usable for forming FlexE Groups. As stated earlier in this application, the FlexE Implementation Agreement will be expanded to adopt newer (higher rate) Ethernet interfaces when the higher rate Ethernet interfaces are introduced by IEEE. When the data rate for Ethernet signals is 100 Gb/s, and 20 slots logical length, then the granularity of the FlexE Calendar would be 5 Gb/s.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (for example, incoming port or fiber to outgoing port or fiber). The GMPLS framework includes a set of signaling and routing protocols which may run, for example, on a control module of a node. The GMPLS routing protocol distributes network topology information through the network so that the route of a label switch path can be calculated. An interior gateway protocol such as OSPF may be used. The GMPLS signaling protocol informs the switches (also known as nodes) along the route the signal takes in the network which labels and links to use for each label switch path. This information is used to program the switching fabric. RSVP protocol may be used for GMPLS transport of traffic. When traffic engineering is required to establish label switch paths with guaranteed Quality of Service characteristics and backup label switch paths that avoid any single point of failure, the traffic engineering (TE) extensions to these protocols are used (OSPF-TE and RSVP-TE respectively). In general, an extension is a set of features/processes/information added to a protocol. The Generalized Multiprotocol Label Switching architecture is defined, for example, in RFC 3471, RFC 3473, and RFC 3945.

A GMPLS "extension" is a term for added features to the GMPLS protocol, as defined by the Internet Engineering Task Force (IETF) (RFC 4775, Procedures for Protocol Extensions). The term GMPLS routing extension refers to an addition to the GMPLS protocol of additional features/processes/information to be used in routing. The term GMPLS signaling extension refers to an addition to the GMPLS protocol of additional features/processes/information to be used in signaling.

IETF stands for Internet Engineering Task Force.

LSP stands for Label Switched Path which is a path through a Generalized Multi-Protocol Label Switching network. Note that Label Switched Paths can be bidirectional or unidirectional. LSPs enable packets to be label switched through the Generalized Multi-protocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OADM stands for optical add/drop multiplexer. ROADM stands for reconfigurable optical add/drop multiplexer.

The term "optical carrier" is commonly used by those skilled in the art to mean a defined particular wavelength (frequency) and optical bandwidth (the supported optical channel bandwidth plus source stability) that carries data in an Optical Transport Network. (As described in ITU-T Recommendation G.872-2017, Sections 6 and Appendix I) Data can be imposed on the optical carrier by increasing signal strength, varying the base frequency, varying the wave phase, or other means. The term "frequency slot" is defined as a frequency range allocated to a given channel and unavailable to other channels with the same flexible grid (FLEX-GRID).

OSPF stands for "Open Shortest Path First." OSPF is a network routing protocol. OSPF is further defined in RFC 2328 and RFC 5340. OSPF-TE stands for OSPF Traffic Engineering. OSPF-TE is an extension of the OSPF network routing protocol for use with GMPLS incorporating traffic engineering OTN stands for Optical Transport Network which includes a set of optical switch nodes which are connected by optical fiber links. ITU-T recommendations G.709 and G.872 define OTN interface requirements and network architecture respectively.

RSVP stands for Resource ReserVation Protocol. RSVP is a network signaling protocol.

RSVP-TE stands for Resource ReserVation Protocol Traffic Engineering. RSVP-TE is an extension of RSVP network signaling protocol for use with GMPLS incorporating traffic engineering.

TE stands for Traffic Engineering. Traffic Engineering is a technology that is concerned with performance optimization of operational networks. In general, TE includes a set of applications, mechanisms, tools, and scientific principles that allow for measuring, modeling, characterizing and control of user data traffic in order to achieve specific performance objectives TE Link stands for Traffic Engineering Link. A TE Link is a logical link that has TE properties. The link represents a way to group/map the information about certain physical resources (and their properties) into the information that is used by Constrained SPF for the purpose of path computation, and by GMPLS signaling. TE links are further described in RFC 4202.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, messages transmitted between the nodes can be processed by circuitry within the input interface(s), and/or the output interface(s) and/or the control module. Circuitry could be analog and/or digital, components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations.

An exemplary FlexE Network 20 is shown in FIG. 1, by way of example. In FIG. 1, the FlexE Network 20 includes switch nodes 22 (hereinafter referred to as "nodes"). Some of the nodes 22 may be referred to as a headend node (also known as a source node) or tailend node (also known as a destination node) for a particular path in accordance with the path setup direction. Other nodes 22 between the headend node and tailend node in a particular path are known as intermediate nodes. The nodes are designated with the reference numerals 22A, 22B, 22C, 22D and 22E. In between the nodes 22 are communication links 30, also known as intermediate links or Traffic Engineering (TE) links. The communication links 30 are denoted in FIG. 1 with the labels 30a, 30b, 30c, 30d, 30e and 30f. The FlexE Network 20 may be configured in any topology, for example, linear, ring, or mesh. The FlexE Network 20 has Ethernet links between the nodes 22. The nodes 22 in the FlexE network 20 realize FlexE groups 1-6 using one or more Ethernet PHY(s) 32 which will be discussed in more detail below. For example, the FlexE group 1 uses four Ethernet PHYs 32a-d, and the FlexE Group 4 uses two Ethernet PHYs 32e-f. Not all of the Ethernet PHYs shown in FIG. 1 have been labeled for purposes of clarity. The FlexE group 3 between nodes 22d and 22e includes an Optical Transport Network 34 including four Ethernet PHYs 32 with each of the Ethernet PHYs having a 100 Gb/s rate. Although FIG. 1 shows FlexE group 3 being transported over the Optical Transport Network 34, the other FlexE groups 1-2 and 4-6 may also be transported over the Optical Transport Network 34.

The links between nodes 22 of the exemplary FlexE Network 20 may be transported over the Optical Transport Network 34, that may contain multiple optical nodes, such as optical line terminals (OLTs), optical crossconnects (OXCs), optical line amplifiers, optical add/drop multiplexer (OADMs) and/or reconfigurable optical add/drop multiplexers (ROADMs), interconnected by way of communication links. Optical nodes are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

Figure 2:
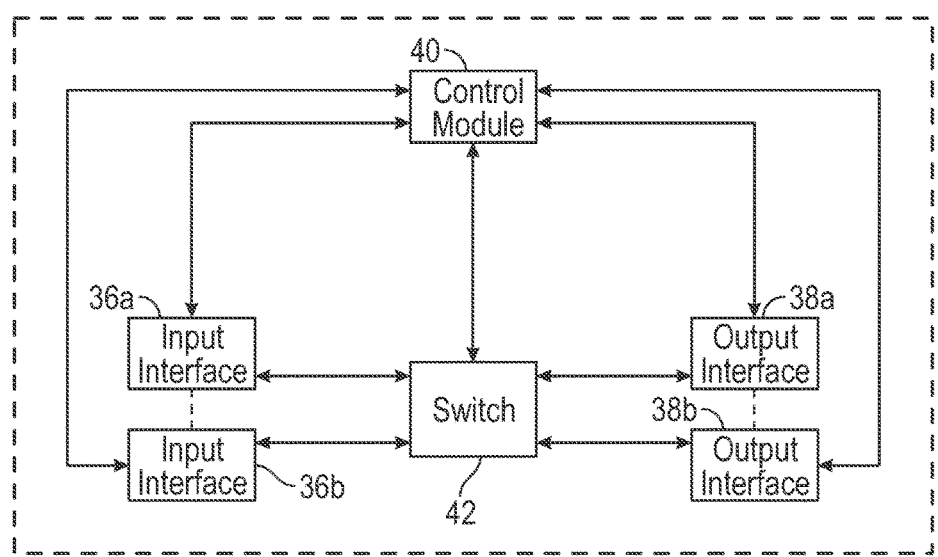
FIG. 2 is a block diagram of an exemplary node in the FlexE Network.

Referring now to FIG. 2, shown therein and designated by reference numeral 22 is an exemplary node 22 constructed in accordance with the present disclosure and which conforms to the requirements of the FlexE technology and the GMPLS protocol. The node 22 includes a data plane including a FlexE Shim layer as defined, for example, in OIF-FLEXE-IA-1.0 that can multiplex and demultiplex FlexE client signals from FlexE Groups based upon a time-multiplexing calendar that may be transmitted with the FlexE client signals. The general exemplary configuration shown may apply to digital nodes. As will be discussed in more detail below, the node 22 is adapted to facilitate the communication of data (which may be referred to herein as "traffic") between multiple nodes 22A-E in the FlexE Network 20 (as shown in FIG. 1). The node 22 in the FlexE Network 20 maintains a database of the topology of the FlexE Network 20 and the current set of network resources available, as well as the resources used to support traffic in the FlexE Network 20. The node 22 is provided with one or more input interfaces 36, one or more output interfaces 38, a control module 40, and a switch 42. The node 22 in FIG. 2 is shown by way of example with two input interfaces 36a-36b and two output interfaces 38a-38b, each of which may be configured as an Ethernet PHY; however node 22 may have any number of input interfaces 36 and output interfaces 38 (some of which may not be configured as an Ethernet PHY). The node 22 may also include non-transitory memory (not shown), either within the control module 40 and/or the switch 42, or separate from the control module 40 and/or the switch 42. The nodes in FIG. 1 can be constructed in a similar manner as the node 22.

In general, the input interfaces 36 are adapted to receive traffic from the FlexE Network 20, and the output interfaces 38 are adapted to transmit traffic onto the FlexE Network 20. The input interfaces 36 de-multiplex the traffic into FlexE client signals (based on a time-multiplexing calendar) that are part of a FlexE Group. The input interfaces 36 are configured to be a FlexE Shim(s) and perform the functions shown in OIF-FLEXE-IA-01.0 FIG. 3. The output interfaces 38 multiplex the FlexE client signals based on the time-multiplexing calendar. The output interfaces 38 are also configured to be a FlexE Shim and perform the functions shown in OIF-FLEXE-IA-01.0 FIG. 2.

Figure 3:
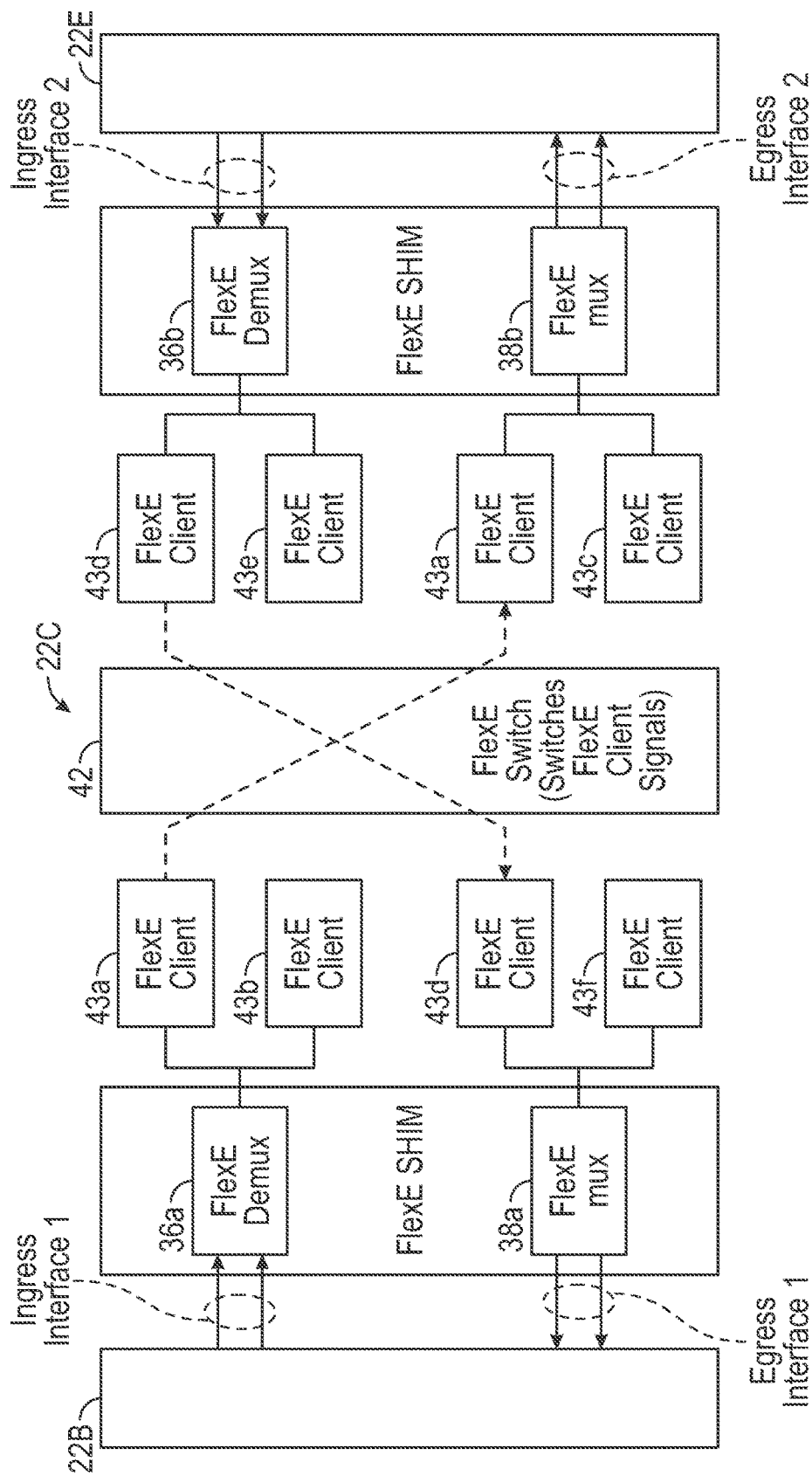
FIG. 3 is a block diagram of a segment of the exemplary FlexE Network consistent with the present disclosure.

Shown in FIG. 3, is a partial schematic diagram of the node 22C showing the functions of switching data between node 22B and node 22E, i.e., two FlexE Groups 4 and 5. As shown, the input interface 36a demultiplexes the traffic into FlexE client signals 43a and 43b from FlexE Group 5 (Node 22B), and supplies the FlexE client signals 43a to the output interface 38b via the switch 42. The output interface 38b multiplexes the FlexE client signals 43a with other FlexE client signals 43c and supplies the multiplexed FlexE client signals 43a and 43c to node 22E as part of FlexE Group 4. The input interface 36b demultiplexes the traffic into FlexE client signals 43d-e from FlexE Group 4 (Node 22E), and supplies the FlexE client signals 43d to the output interface 38a via the switch 42. The output interface 38a multiplexes the FlexE client signals 43d with other FlexE client signals 43*f* and supplies the multiplexed FlexE client signals 43*d* and 43*f* to node 22B as part of FlexE Group 5.

Multiple output interfaces 38 can supply corresponding FlexE client signals. The switch 42 serves to communicate the FlexE client signals from the input interface(s) 36, to the output interface(s) 38 to switch the FlexE client signals to another FlexE Group. The switch 42 can be implemented as a time division multiplexing fabric, such as an Optical Data Unit (ODU) switch, or a packet switch. The control module 40 serves to set up the FlexE Groups and FlexE Clients, and to control the operations of the input interfaces 36, the output interfaces 38, and the switch 42. The control module 40 can be referred to herein as a control plane. The control plane may use the GMPLS protocol to setup one or more label switched paths of various bandwidths within the FlexE Network 20. The bandwidth of each of the label switched paths is subject to the granularity of the links that support the end to end label switched paths.

It should be noted that each FlexE Group can have independent characteristics (e.g., Ethernet PHY rate, BW granularity, number of members). Each of the FlexE clients that is demultiplexed at the input interface 36 can be switched independently of other FlexE clients to different output interfaces 38. As such, it is not a requirement that all FlexE Clients must travel together in the FlexE Network 20.

The node 22 can be implemented in a variety of manners, including commercial installations having one or more backplanes (not shown), racks, and the like. In one example, the input interfaces 36, the output interfaces 38, the control module 40 and the switch 42 are typically implemented as separate devices, which may have their own power supply, local memory and processing equipment. In another example, the node 22 can be implemented as a single device having a shared power supply, memory and processing equipment. Or, in another example, the node 22 can be implemented in a modular manner in which one or more of the input interfaces 36, the output interfaces 38, the control module 40 and the switch 42 share a power supply and/or housing.

The input interfaces 36, and the output interfaces 38 of one node 22 are adapted to communicate with corresponding input interfaces 36, and output interfaces 38 of another node 22 within the FlexE Network 20 via appropriate communication links 30*a-f* (as shown in FIG. 1). An example of an input interface 36 and/or an output interface 38 is an Ethernet port on a card which processes Ethernet signals. In general, each of the input interfaces 36 and/or the output interfaces 38 may have a unique logical identification, such as an IP address. The communication link 30 can be implemented in a variety of manners, such as a physical link including an optical fiber or other waveguide. The implementation of the input interfaces 36, and the output interfaces 38 will depend upon the particular type of communication link 30 that the particular input interface 36 and/or output interface 38 is designed to communicate with. For a particular node 22, the input interfaces 36 can be of the same type or different types; the output interfaces 38 can be of the same type or different types; and the input and output interfaces 36 and 38 can be of the same type or different types. For example, the input and output interfaces of a particular node 22 can be of different types if the node 22 supports FlexE groups with different characteristics: e.g. Ethernet PHY rate, granularity etc.

In accordance with the present disclosure, messages transmitted between the nodes 22, can be processed by circuitry within the input interface(s) 36, and/or the output interface(s) 38 and/or the control module 40.

Though some variations have been described herein, it should be understood that the node 22 can be implemented in a variety of manners.

Figure 4:
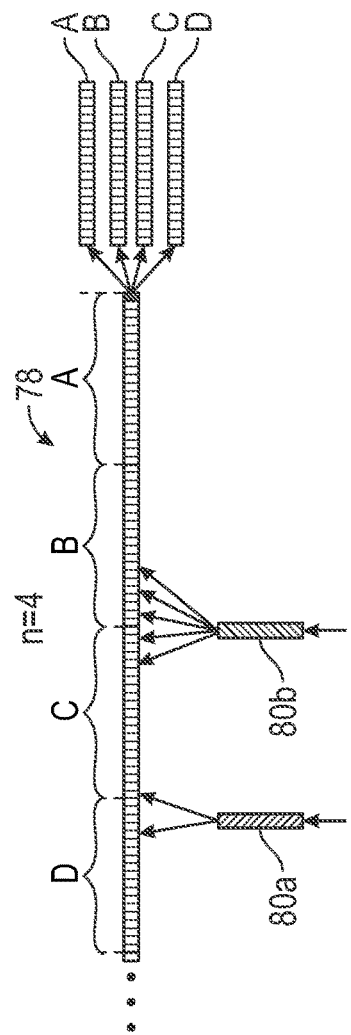
FIG. 4 is a schematic diagram of a time-domain multiplexing FlexE calendar for scheduling and implementing a FlexE Group in which a rate of 100 Gb/s is divided into 20 slots with a granularity of 5 Gb/s.

FIG. 4 is a schematic diagram of a time-domain multiplexing FlexE calendar 78 for scheduling and implementing the FlexE Group of FIG. 4 in which four ethernet PHYs A-D are bonded together. Each of the Ethernet PHYs may be provided with a rate of 100 Gb/s that is divided into 20 slots with a granularity of 5 Gb/s/slot. The total capacity of the FlexE group is 400 GB/s and there are a total of 80 slots within the FlexE calendar 78. In the example shown, a first FlexE client 80*a* and a second FlexE client 80*b* are set up with the first FlexE client 80*a* being allocated 10 GB of the FlexE Group, and the other one of the FlexE clients being allocated 25 GB of the FlexE group.

It should be understood that any number of slots within the FlexE calendar 78 can be allocated to a particular FlexE client so long as the slots are available at the time the FlexE client is added to the FlexE group. Further, it should be understood that the capacity within the FlexE calendar 78 allocated to any particular FlexE client can be distributed over more than one Ethernet PHY.

For example, as shown in FIG. 4, all of the 10 GB capacity with respect to the first FlexE client 80*a* is allocated to two slots to be transmitted by the Ethernet PHY D; and all of the 25 GB capacity with respect to the second FlexE client 80*b* is allocated to five slots which are split among the Ethernet PHY B and the Ethernet PHY C. In this case, the number of slots and the location of the slots within the FlexE calendar 78 for any particular FlexE client may be determined based upon availability with respect to other FlexE clients that are included in the FlexE Group. At any given time, the calendar configuration is used for mapping the FlexE clients into the FlexE group and demapping the FlexE clients from the FlexE group. The calendar configuration is provided to facilitate reconfiguration. When a switch of calendar configurations adds or removes one or more FlexE clients from the FlexE group, existing FlexE clients whose size and calendar slot assignments are not changed by changing the calendar configuration are not affected.

The FlexE Calendar 78 represents the Ethernet PHYs A-D being time multiplexed together. In one embodiment, each of the Ethernet PHYs A-D sequentially (i.e., in order) transmit the data within slots 0-19. Because the Ethernet PHYs A-D are synchronized, the Ethernet PHYs A-D transmit the data within slot 0 beginning at a first instant of time, the data within slot 1 beginning at a second instant of time, etc.

The control module 40 of the node 22 that is capable of FlexE Group switching may advertise bandwidth availability by advertising available slots to the control module 40 of other nodes 22 in the FlexE Network 20. This may be accomplished by using a communication system that is not a part of the data plane, i.e., the input interfaces 36*a-b* and output interfaces 38*a-b*. The advertisements may include a number of available calendar slots and the granularity. The node 22 computing a FlexE label switched path (LSP) in the FlexE Network 20, such as source node 24D in FIG. 3, determines the number of slots required for a FlexE Client and then looks for FlexE Bandwidth availability on each communication link 30, for example, in both directions, from bandwidth advertising. If FlexE Bandwidth is available, the control module 40 of the node 22 computing the network path then selects the FlexE Group for FlexE Client creation and signals for FlexE Client creation. In some embodiments, once the FlexE Client is created, the control module 40 of the node 22 updates the bandwidth available via a new advertisement to other nodes 22 in the FlexE Network 20 using a message conforming to current GMPLS protocol.

New FlexE Parameters GMPLS Signaling Extension Data Structure

Figure 5:
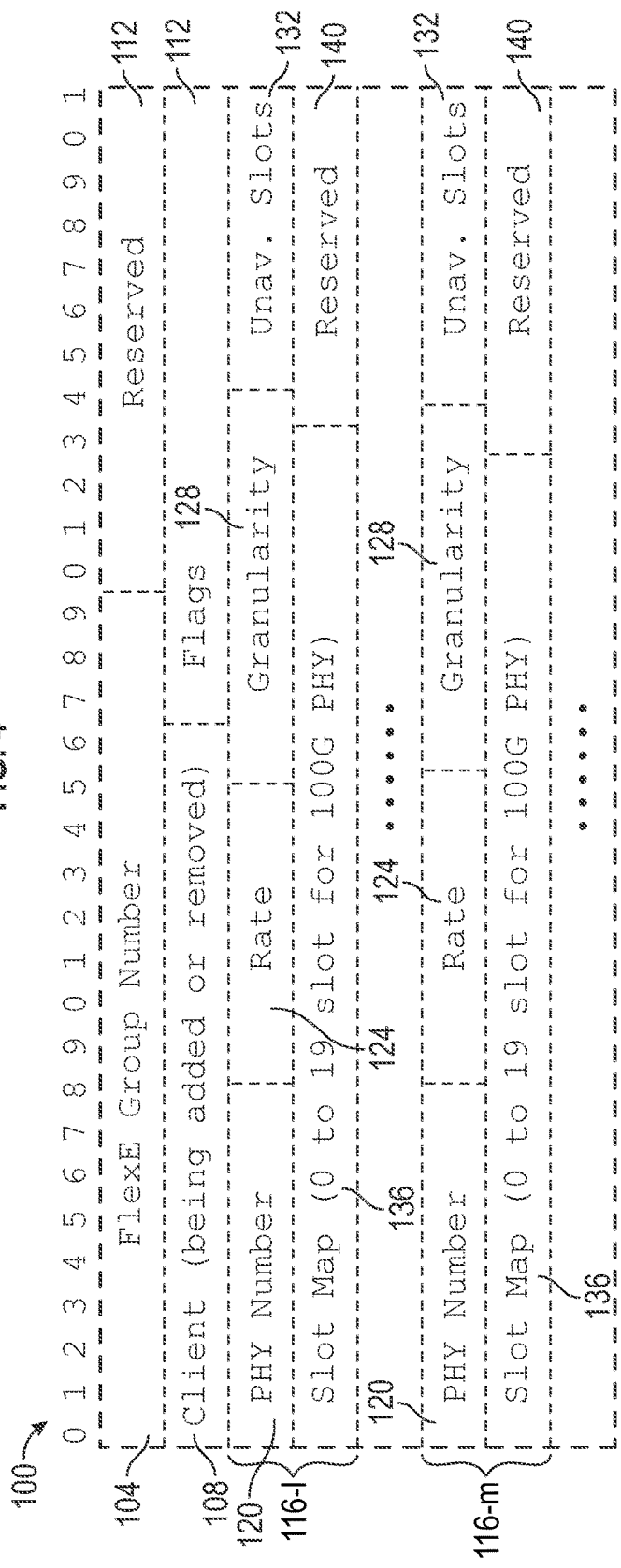
FIG. 5 is an exemplary new FlexE Parameters GMPLS signaling extension data structure in accordance with the present disclosure.

Shown in FIG. 5 is a FlexE generalized label 100 that can be used as an extension to RSVP-TE signaling for GMPLS to support the setup of FlexE Groups and the addition of FlexE clients to a FlexE Group. The FlexE generalized label 100 allows for possible calendar granularity and/or calendar size changes that might be required for Ethernet PHY rates such as 400 G. Currently, a FlexE Group includes 1 to n 100 GBASE-R Ethernet PHYs. The proposed generalized label format 100 lists all PHY numbers (e.g., 1 to 254) that are members of a particular FlexE group. For a FlexE client, the FlexE generalized label 100 also lists calendar slots in each member Ethernet PHY that are assigned to the FlexE client.

The FlexE generalized label 100 includes a FlexE Group Number field 104, a Client field 108, and one or more reserved fields 112 (one of which is labeled in FIG. 5 with the notation "Flags". The FlexE Group Number field 104 (e.g., 20 bits) may be used to specify a FlexE Group Number to identify a particular FlexE Group within the FlexE Network 20a. Specifying a FlexE Group Number allows the nodes 22 transporting information within the FlexE Group to check that the correct Ethernet PHY is being received from the correct group number. The Client field 108 (e.g., 16 bits) field indicates which of the FlexE clients is mapped into a given calendar slot in an A and B calendar configurations for the sub-calendar carried over that PHY. The A and B calendar configurations are defined in OIF-FlexE-IA-1.0. The A and B calendar configurations are used to make changes to the operating configurations within the FlexE Network 20, for example. Having two calendars allows the nodes 22 to automatically switch from one configuration (i.e. set of FlexE clients) to a different configuration (i.e. with a different set of FlexE clients). The A and B calendar configurations provide a mechanism that is used to add/remove/modify FlexE clients. The Flags field 112 (e.g., 8 bits) is reserved for future use.

The FlexE generalized label 100 also includes one or more Ethernet PHY sub-labels 116, two of which are shown in FIG. 5 and designated by the reference numerals 116-1 to 116-m. Each of the Ethernet PHY sub labels 116 includes a Phy Number field 120, a Rate field 124, a Granularity field 128, an Unavailable Slots field 132, a Slot Map field 136 and a Reserved field 140. Although only two of the Ethernet PHY sub-labels 116 are shown, it should be understood that the FlexE generalized label 100 can be provided with any number of the Ethernet PHY sub-labels 116 up to the maximum number of Ethernet PHYs usable by the FlexE group.

The Ethernet PHY Number field 120 (e.g., 8 bits) is used to identify a particular Ethernet PHY by a number which may be in the 1-254 range, for example.

The Rate field 124 (e.g., 8 bits) is used to specify a rate of the given Ethernet PHY number. Currently the standards have defined the Ethernet PHY rate to be 100 Gb/s. However, the Rate field 124 field may be used to indicate other PHY rates (e.g., 400 Gb/s, 1 Tb/s, etc.).

The Granularity field 128 (e.g., 8 bits) is used to indicate granularity of the FlexE calendar. Currently, the standards have defined a fixed 5 G granularity. However, the Granularity field 128 may have additional values, as further granularity are defined and become part of the FlexE standard.

The Slot Map field 136 (e.g., 20 bits) is used to indicate which calendar slots of the associated Ethernet PHY number is assigned to a given FlexE client. For an Ethernet PHY with a rate of 100 G and granularity of 5 G, the slot map consists of 20 slots (0-19 range). In the current standard, all members (i.e., PHYs) within a FlexE group have the same rate (e.g., 100 G), same granularity (e.g., 5 G), and hence same number of slots (e.g., 20 slots). When other Ethernet PHY rates and/or calender granularities are defined and become part of the standard, the slot map size for an Ethernet PHY can be derived based on the Rate and Granularity field values.

By providing the rate field 124, the granularity field 128 and the slot map field 136, additional information can be supplied to the node 22 to assist the node in configuring FlexE Groups and configuring the components in the FlexE Groups within the FlexE Network 20. When other Ethernet PHY rates and/or calendar granularities are defined and become part of the standard, the slot map size for an Ethernet PHY can be derived based on the Rate and Granularity field values. This permits an operator to configure specific nodes within the FlexE Network 20 by assigning a first granularity and first number of slots to a first Ethernet PHY (i.e., a first physical port), and a second granularity and a second number of slots to a second Ethernet PHY (i.e., a second physical port) in which the first granularity is different from the second granularity, and/or the first number of slots is different than the second number of slots. Thus, multiple FlexE Groups can be calculated and configured taking into account different amounts of granularities and/or number of slots on a port by port basis. But, in some embodiments, each FlexE Group has a homogenous granularity and number of slots for the Ethernet PHYs.

The Unavailable Slots field 132 (e.g., 8 bits) is used to indicate the number of unavailable calendar slots (0-19 range) for example due to transport network constraints (i.e., no FlexE client should be assigned to the unused slots). The Unavailable slots may be placed at the end of each relevant sub-calendar (i.e., the highest numbered slots).

Figure 6:
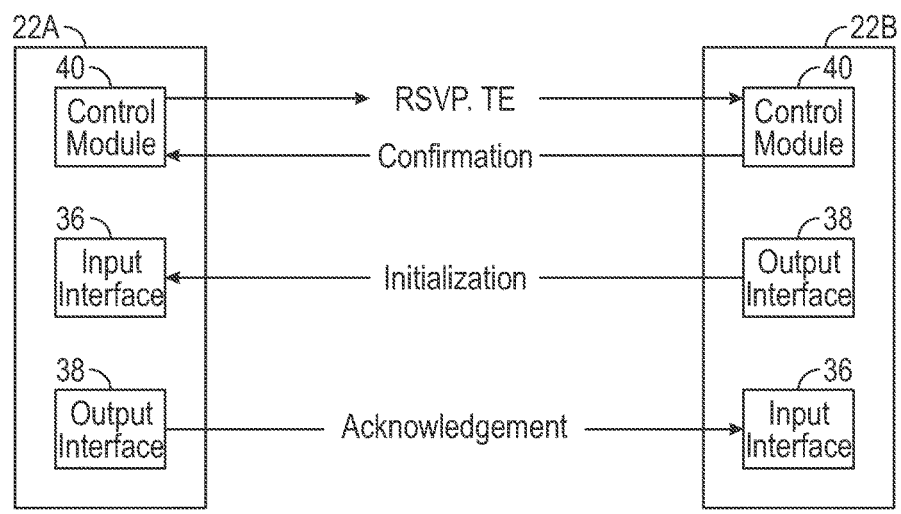
FIG. 6 is a schematic diagram of a signaling exchange between control modules and input and output interfaces for two nodes for setting up a FlexE Group.

As an example, the following is an explanation of how to setup a FlexE Group between the nodes 22A and 22B shown in FIG. 6. To form a new FlexE Group, an initial configuration is configured at both the node 22A and the node 22B. In some embodiments, setting up a FlexE Group involves out of band communication between the control modules 40 of the nodes 22A and 22B, as well as in band communication between the input and output interfaces 36 and 38 of the nodes 22A and 22B. For example, if it is desired to establish a FlexE group containing two 100 G Ethernet PHYs, the control module 40 of a node 22A sends an RSVP-TE message containing the FlexE generalized label 100 to the control module of node 22B with the following field values:

FlexE Group Number=100 (e.g., any unused number), Client=0x0000 (i.e., no client); First Ethernet PHY Number=5 (e.g., any unused Ethernet PHY), Rate=100 G, Granularity=5 G, Unavailable Slots=0, Slot Map=0-19 bit set to 0 (i.e., all slots available); Second PHY Number=7 (e.g., any unused Ethernet PHY), Rate=100 G, Granularity=5 G, Unavailable Slots=0, Slot Map=0-19 bit set to 0 (i.e., all slots available).

Upon receipt of the FlexE generalized label 100, the node 22B configures the FlexE group number and the Ethernet PHY information. Then, the FlexE Group is validated using in-band signaling between the nodes 22A and 22B. In some embodiments, this can be accomplished by the control module 40 of the node 22A transmitting initialization information to the node 22B using in-band (i.e., the output interface 38) communications with the same parameters settings that were used when out of band communication mechanisms were used to exchange the RSVP-TE messages with the node 22B, e.g., FlexE group number=100, client=0x0000 (i.e., since no client is present yet), PHY Map fields are set to indicate Ethernet PHY 5 and 7). Upon receipt of the initialization information by the input interface 36 of the node 22B, the node 22B sends an acknowledgement to the node 22A using in-band (i.e., output interface 38) communication mechanisms which may have the same parameter settings that were supplied by the node 22A to the node 22B, e.g., FlexE group number=100, client=0x0000 (i.e., since no client is present yet), PHY Map fields are set to indicate PHY 5 and 7.

The FlexE group becomes operational and ready to add FlexE clients when all incoming Ethernet PHYs are up, receiving FlexE overhead on each of the expected Ethernet PHYs within an allowable skew tolerance of each other, and the received Ethernet PHYs all indicate the expected Ethernet PHYs (i.e., Ethernet PHYs 5 and 7) as being part of the group. When the FlexE Group is first configured and brought into service, all of the calendar slots may be set to "unused" or "available". Now FlexE clients can be added to the FlexE Group using the following signaling procedure and validated to supply control signals to the appropriate input and output interfaces 36 and 38 to set up the Ethernet PHYs.

When a FlexE group is configured, all calendar slots may be listed as "available"—meaning that the calendar slots can be allocated to FlexE clients. In some embodiments, some of the calendar slots may be listed as unavailable and others of the slots may be listed as available for allocation to FlexE clients. In some embodiments, the FlexE calendar carries information about (a) identities of the FlexE client which occupy (i.e., have control of) one or more 5 G calendar slots within the Ethernet PHY(s) (b) calendar slots which are available for allocation to other clients (i.e. these are currently unallocated). Item (b) is used for bandwidth advertisements; item (a) is utilized by the data plane to correctly distribute/reassemble FlexE client signals to/from a set of calendar slots. The addition (or removal) of a FlexE client will need to change the calendar associated with a FlexE group. The list of available calendar slots will change as clients are added/removed.

After a particular FlexE Group has been brought into service, suppose it is desired to establish a FlexE client of rate 50 G from node 22A and 22B to the FlexE group identified by the number 100 created previously. This can be accomplished by using a combination of signaling with the control plane and the data plane. In some embodiments, the control module 40 of the node 22A sends a RSVP-TE message containing a FlexE generalized label 100 to the control module 40 of the node 22B with the following field values: FlexE Group Number=100, Client=0x0001 (i.e., client id=1); First PHY Number=5, Rate=100 G, Granularity=5 G, Unavailable Slots=0, Slot Map=0 to 4 bit set to 1 (i.e., 25 G on Ethernet PHY number 5); and Second PHY Number=7, Rate-100 G, Granularity=5 G, Unavailable Slots=0, Slot Map=0 to 4 bit set to 1 (i.e., 25 G on Ethernet PHY number 7). The control module 40 of the node 22B receives the FlexE generalized label 100, checks to see if the requested slots are available, creates a subtending object (i.e. the FlexE client) indicating that this new FlexE client is occupying specific calendar slots of a particular FlexE Group and sends an RSVP reservation message to the node 22A, for example. If the node 22A receives the RSVP reservation message prior to expiration of the timer, the node 22A sends a calendar switch signal to the node 22B indicating a change to the FlexE Calendar. If the calendar switch acknowledgement is not received within the expiration of the timer, the node 22A may raise an alarm, or proceed with switch based on locally configured policy. The node 22B may also update the available BW on the FlexE link.

The control module 40 of the node 22A also initiates a calendar switch process through the data plane in which the input interfaces 36 and the output interfaces 38 of the nodes 22A and 22B are setup. If there are intermediate nodes between nodes 22A and 22B, then the FlexE client addition occurs at each interface of each of the intermediate nodes on a hop-by-hop basis. The calendar switch/acknowledgement/complete sequence of messages occurs at each hop. When all of the calendar switches at all intermediate hops are completed, then the FlexE Client has been added and the FlexE LSP is operational for the FlexE Client.

It should be understood that RSVP-TE signaling by the control modules 40 using the FlexE generalized label 100 in accordance with the present disclosure to establish the control plane state can occur concurrently with the data plane activities to reflect the reservations accomplished for a particular FlexE client. The calendar switch/acknowledgement/complete sequence is part of the data plane signaling. For example, assuming that the FlexE Group is formed with node 22A as a headend, node 22B as a tailend and node 22C as an intermediate, as the RSVP-TE signaling request flows past node 22C to node 22B, nodes 22A and 22C can setup the calendars in the hop between node 22A and node 22C. Thus, the RSVP-TE control plane and data plane signaling can occur in parallel thereby reducing the time for the FlexE LSP to be operational for a particular FlexE client.

CONCLUSION

Conventionally, there is no automated methodology for setting up or provisioning label switched paths within the FlexE Network. The mechanisms proposed in this disclosure circumvent the problems described above. The problem of lack of systems and methods to automate the set up of one or more label switched paths of various bandwidths within a FlexE Network is addressed with methodologies and systems that pass signals between control planes of nodes conforming to the Generalized Multiprotocol Label Switching (GMPLS) protocol. The signals passed between the control planes also conform to the GMPLS protocol and comprise a FlexE Ethernet Group Number and identify at least one Ethernet PHY conforming to the requirements of IEEE 802.3. The Flexible Ethernet Group Number and the at least one Ethernet PHY are stored in non-transitory memory of a node within the FlexE Network. Then, the node configures a FlexE Group based upon the Flexible Ethernet Group Number and the at least one Ethernet PHY to reserve bandwidth for potential FlexE label switched paths set up for FlexE clients. Once the FlexE Group is setup, then the available bandwidth is advertised to nodes within the FlexE Network and can be used by the nodes within the FlexE Network to set up the FlexE label switched paths.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling.

In addition, information regarding the FlexE Networks can be stored and processed in a distributed fashion, or in a centralized fashion. For example, information can be stored in a distributed fashion (distributed storage having multiple memory/storage devices) and processed in a distributed manner preferably by using a hop-to-hop processing. In another implementation, the distributed storage may be replaced by a centralized memory that stores the slot information for all, or a subset, of the nodes. In this situation, the nodes may include communication paths to obtain the information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method comprising the steps of:
    receiving, by a control module of a node conforming to a FlexE Ethernet protocol and Generalized Multiprotocol Label Switching (GMPLS) protocol, a signal conforming to the GMPLS protocol, the signal comprising a Flexible Ethernet Group Number identifying a FlexE Group to be configured and identifying a first Ethernet PHY and a second Ethernet PHY, each of the first and second Ethernet PHYs being a port conforming to the requirements of IEEE 802.3-2015, the FlexE Group having the first Ethernet PHY bonded to the second Ethernet PHY such that a first transmission capacity of the first Ethernet PHY and a second transmission capacity of the second Ethernet PHY are summed and usable logically together in accordance with a time-domain multiplexing calendar having a plurality of slots;
    storing the Flexible Ethernet Group Number and the at least one Ethernet port into non-transitory memory accessible by the control module of the node; and
    configuring first circuitry of the control module and second circuitry of at least one input interface of the node to establish the FlexE Group identified by the Flexible Ethernet Group Number, the FlexE Group reserving the first transmission capacity of the first Ethernet PHY and the second transmission capacity of the second Ethernet PHY in accordance with the time-domain multiplexing calendar.

2. The method of claim 1, wherein the step of configuring the FlexE Group is defined further as configuring the FlexE Group using the GMPLS protocol.

3. The method of claim 1, wherein the plurality of slots includes a first slot of the time-domain multiplexing calendar reserving a portion of the first transmission capacity of the first Ethernet PHY, and the plurality of slots includes a second slot of the time-domain multiplexing calendar reserving a portion of the second transmission capacity of the second Ethernet PHY.

4. The method of claim 1, wherein the signal is a RSVP-TE message containing the Flexible Ethernet Group Number, a First PHY Number identifying the first Ethernet PHY, a first rate identifying the first transmission capacity, a first granularity identifying a first slot transmission capacity, and a first slot map, a second PHY Number identifying the second Ethernet PHY, a second rate identifying the second transmission capacity, a second granularity identifying a second slot transmission capacity, and a second slot map, and wherein the step of configuring is defined further as using the first and second slot map to define at least a portion of the time-domain multiplexing calendar for the FlexE Group.

5. The method of claim 1, further comprising adding a client to the FlexE Group.

6. The method of claim 5, wherein the signal is a first signal, and wherein adding the client to the FlexE Group further comprises: receiving a second signal by the control module of the node, the second signal conforming to the GMPLS protocol, the second signal comprising the Flexible Ethernet Group Number identifying the FlexE Group, a client identifier, and one or more requested slots within the time-multiplexing calendar; checking to see if the requested slots are available, and changing the time-domain multiplexing calendar to reserve the one or more requested slots for the client.

7. The method of claim 1, further comprising removing a client from the FlexE Group.

8. The method of claim 7, wherein the signal is a first signal, and wherein removing the client from the FlexE Group further comprises: receiving a second signal by the control module of the node, the second signal conforming to the GMPLS protocol, the second signal comprising the Flexible Ethernet Group Number identifying the FlexE Group, a client identifier identifying the client to remove, and one or more slots assigned to the client within the time-multiplexing calendar; and changing the time-domain multiplexing calendar to demap the one or more slots assigned to the client.

9. A node, comprising:
    a first Ethernet PHY;
    a second Ethernet PHY, the first and second Ethernet PHYs each being a port conforming to the requirements of 802.3-2015; and
    a control module conforming to a FlexE Ethernet protocol and a Generalized Multiprotocol Label Switching (GMPLS) protocol, the control module having logic that when executed by at least one processor, causes the processor to:
    receive a signal conforming to the GMPLS protocol, the signal comprising a Flexible Ethernet Group Number identifying a FlexE Group to be configured and identifying the first Ethernet PHY and the second Ethernet PHY, the FlexE Group having the first Ethernet PHY bonded to the second Ethernet PHY such that a first transmission capacity of the first Ethernet PHY and a second transmission capacity of the second Ethernet PHY are summed and usable logically together in accordance with a time-domain multiplexing calendar having a plurality of slots;

store the Flexible Ethernet Group Number and the first Ethernet PHY and the second Ethernet PHY into non-transitory memory accessible by the control module of the node; and configure first circuitry of the control module and second circuitry of at least one port to establish the FlexE Group identified by the Flexible Ethernet Group Number, the FlexE Group reserving the first transmission capacity of the first Ethernet PHY and the second transmission capacity of the second Ethernet PHY in accordance with the time-domain multiplexing calendar.

10. The node of claim 9, wherein configuring the FlexE Group is defined further as configuring the FlexE Group using the GMPLS protocol.

11. The node of claim 9, wherein the plurality of slots includes a first slot of the time-domain multiplexing calendar reserving a portion of the first transmission capacity of the first Ethernet PHY, and the plurality of slots includes a second slot of the time-domain multiplexing calendar reserving a portion of the second transmission capacity of the second Ethernet PHY.

12. The node of claim 9, wherein the signal is a RSVP-TE message containing the Flexible Ethernet Group Number, a First PHY Number identifying the first Ethernet PHY, a first rate identifying the first transmission capacity, a first granularity identifying a first slot transmission capacity, and a first slot map, a second PHY Number identifying the second Ethernet PHY, a second rate identifying the second transmission capacity, a second granularity identifying a second slot transmission capacity, and a second slot map, and wherein configuring is defined further as using the first and second slot map to define at least a portion of the time-domain multiplexing calendar for the FlexE Group.

13. The node of claim 9, wherein the logic that when executed by at least one processor, causes the processor to add a client to the FlexE Group.

14. The node of claim 13, wherein the signal is a first signal, and wherein adding the client to the FlexE Group further comprises: receiving a second signal by the control module of the node, the second signal conforming to the GMPLS protocol, the second signal comprising the Flexible Ethernet Group Number identifying the FlexE Group, a client identifier, and one or more requested slots within the time-multiplexing calendar; checking to see if the requested slots are available, and changing the time-domain multiplexing calendar to reserve the one or more requested slots for the client.

15. The method of claim 9, wherein the logic that when executed by at least one processor, causes the processor to remove a client from the FlexE Group.

16. The method of claim 15, wherein the signal is a first signal, and wherein removing the client from the FlexE Group further comprises: receiving a second signal by the control module of the node, the second signal conforming to the GMPLS protocol, the second signal comprising the Flexible Ethernet Group Number identifying the FlexE Group, a client identifier identifying the client to remove, and one or more slots assigned to the client within the time-multiplexing calendar; and changing the time-domain multiplexing calendar to demap the one or more slots assigned to the client.

* * * * *